United States Patent
Takeda et al.

(10) Patent No.: US 6,561,337 B2
(45) Date of Patent: *May 13, 2003

(54) CLUTCH RELEASE BEARING

(75) Inventors: Masao Takeda; Haruyuki Aihara, both of Fujisawa (JP)

(73) Assignee: NSK Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 120 days.

(21) Appl. No.: 09/521,356

(22) Filed: Mar. 8, 2000

(65) Prior Publication Data
US 2001/0045335 A1 Nov. 29, 2001

(30) Foreign Application Priority Data

Mar. 9, 1999 (JP) .............................. 11-060989
Jan. 26, 2000 (JP) ........................... 12-021727

(51) Int. Cl.⁷ .............................................. F16O 23/14
(52) U.S. Cl. .................... 192/98; 192/110 B; 384/482; 384/607; 277/351; 277/562
(58) Field of Search ............................. 192/98, 110 B; 384/480, 482, 607; 277/351, 549, 562

(56) References Cited

U.S. PATENT DOCUMENTS

| | | | |
|---|---|---|---|
| 3,642,335 A | | 2/1972 | Takahashi et al. |
| 3,870,384 A | * | 3/1975 | Ladin .......................... 384/482 |
| 4,204,720 A | * | 5/1980 | Otani ........................ 192/98 X |
| 4,428,629 A | | 1/1984 | Colanzi et al. |
| 4,838,402 A | * | 6/1989 | Feser .......................... 192/98 |
| 5,544,963 A | * | 8/1996 | Kajihara et al. ............. 384/482 |
| 5,580,176 A | * | 12/1996 | Stallmann ................... 384/482 |

FOREIGN PATENT DOCUMENTS

| | | | | |
|---|---|---|---|---|
| DE | 3640289 A1 | * | 6/1988 | ............. 192/110 B |
| DE | 19503217 | | 8/1996 | |
| DE | 19709056 | | 9/1998 | |
| FR | 2698137 | | 5/1994 | |
| JP | 2-138229 | | 11/1990 | |
| JP | 5-346138 | * | 12/1993 | ............. 192/110 B |
| JP | 10-103380 | | 4/1998 | |
| JP | 11-344502 | | 12/1999 | |

* cited by examiner

Primary Examiner—Richard M. Lorence
(74) Attorney, Agent, or Firm—Katten Muchin Zavis Rosenman

(57) ABSTRACT

A seal for sealing between the inner ring and outer ring of the clutch release bearing comprising a labyrinth seal section extending from one of the inner ring and outer ring and kept in a non-contact state with reference to the other ring, and a contact seal section comprising a lip portion and provided on the internal side of the labyrinth seal and kept in a contact state with reference to the other ring, and the lip portion acting to obstruct semi-fluidized foreign matter which enters through the labyrinth seal.

3 Claims, 3 Drawing Sheets

CLUTCH RELEASE BEARING

FIELD OF THE INVENTION

The present invention relates to a clutch release bearing, and particularly a seal which is suitable for the clutch release bearing to achieve excellent seal performance.

BACKGROUND OF THE INVENTION

The clutch is a power connecting and disconnecting device using a friction plate, and can be installed in a vehicle etc. such as automobiles, tractors, forklifts. For an input member of the clutch, a shift fork is used. In the case of operating the clutch, disconnection of power transmission is achieved by pressing in an axial direction the diaphragm spring in the clutch cover with the shift fork so as to release the energizing force of the diaphragm spring from the friction plate.

Incidentally, the shift fork is usually provided on the stationary side such as the vehicle body etc. The clutch cover is mounted to the flywheel etc. of the engine to rotate together with it. Accordingly, if the diaphragm spring of the clutch cover is directly pressed by the shift fork, the contact portions are subjected to wear.

Accordingly, as disclosed in Toku Kai Hei. No. 10-103380, a clutch release bearing device is provided between the diaphragm spring and the shift fork. The clutch release bearing device comprises a clutch release bearing having a rotatable ring which is abutted to the diaphragm spring and rotated together with it, and a stationary bearing support member which holds the bearing in a predetermined state while receiving an input from the shift fork.

Since the clutch is constructed such that a friction plate is interposed between the relatively rotating metal plates to utilize the friction forces acting each other for power transmission, abrasion powders are scattered from the friction plates on the clutch (engine) side. Then, such foreign matter enters between the races and the rolling members of the clutch release bearing, premature wear may be caused in the races and the rolling members. Accordingly, in the prior art clutch release device, a labyrinth seal is used between the inner ring and the outer ring for sealing, thereby preventing the penetration of the foreign matter.

Incidentally, recently, as the engine performance is increased, the heat generation from the engine is increased. In order to prevent the temperature increase around the engine due to the increased heat generation, forming air vents for cooling in the housing surrounding the clutch is considered. However, foreign matter such as dust and water etc. may enter through the air vents from outside. Although, the labyrinth seal can prevent relatively large solid foreign matter from entering the interior of the bearing, the foreign matter such as muddy water may pass through the labyrinth seal to enter between the races and the rolling members, thereby causing premature wear. As measures for such premature wear, the replacement of the clutch release bearing at a short cycle can be considered, but it will inconveniently increase the maintenance costs.

SUMMARY OF THE INVENTION

To solve the problems as mentioned above, an objective of the present invention is to provide a clutch release bearing with increased seal effects.

Another objective of the present invention is to provide a seal for clutch release bearing with increased seal effects.

DETAILED DESCRIPTION OF THE PREFERRED EMBODIMENTS

Figure 1:
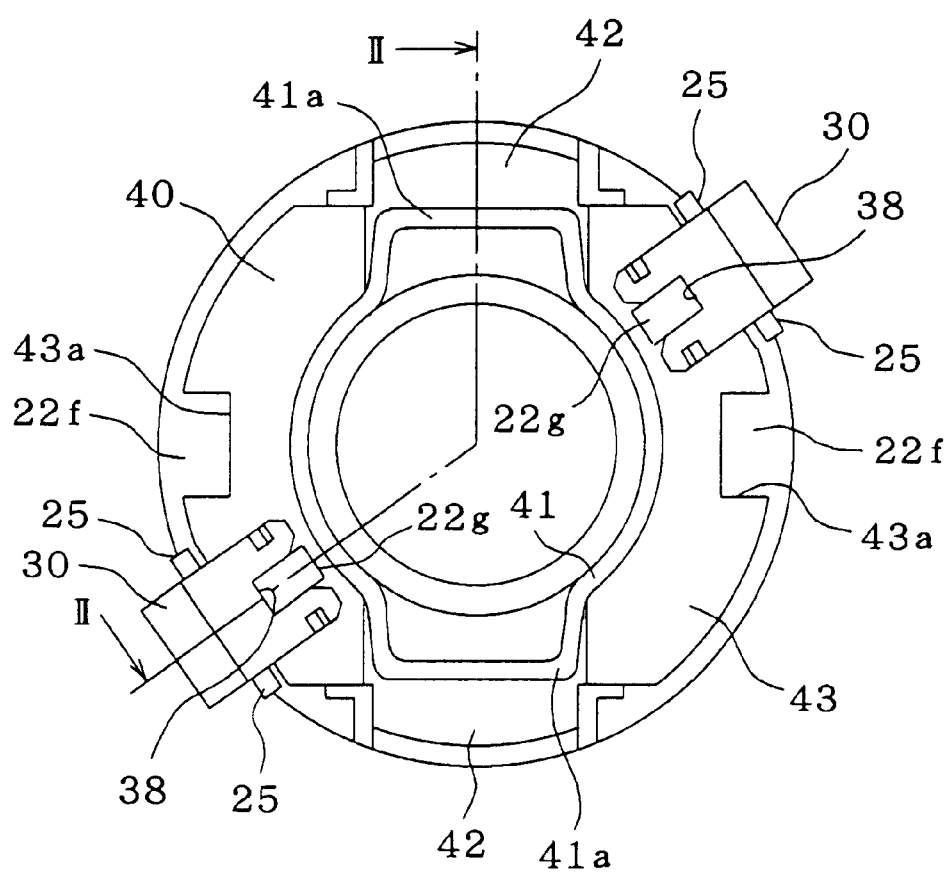
FIG. 1 is a view of a clutch release bearing device incorporating an embodiment of the present invention, from the side of the shift fork.

The clutch release bearing in the present invention has a seal for sealing between the inner ring and outer ring of the bearing, which comprises a labyrinth seal section extending from one of the inner ring and outer ring and kept in a non-contact state with reference to the outer ring, and a contact seal section comprising a lip portion and provided on the internal side of the labyrinth seal section and kept in a contact state with reference to the outer ring. The lip portion acts to obstruct foreign matter which might enter through the labyrinth seal.

Since the seal comprises the labyrinth seal section extending from one of the inner ring and outer ring and kept in a non-contact state with reference to the other ring, and the lip portion provided on the internal side of the labyrinth seal section and kept in a contact state with reference to the other ring, for example relatively large solid foreign matter is captured at the labyrinth seal section, and it is prevented from entering the interior of the bearing. On the other hand, fluid or semi-fluidized foreign matter such as dirty water, which may not be captured at the labyrinth seal section, is captured at the contact seal section or lip portion, and it is prevented from entering the interior of the bearing. Accordingly, the seal effects of the seal can be improved.

In a feature of the present invention, a clutch release bearing comprises an outer ring which in not rotatable during use, a rotatable inner ring which is rotatable during use and has an outer diameter, rolling members which are provided between the outer ring and the inner ring, and a seal which is fixed to the outer ring, and comprises a labyrinth seal section located in an external portion of the bearing to form a labyrinth seal with the inner ring, and a contact seal section located in an internal portion of the bearing to be in a slight contact relationship with the inner ring such that the ratio of the interference with respect to the outer diameter of the inner ring is between from $\frac{1}{1000}$ to $\frac{1}{100}$, and having a protrusion located on the internal side portion of the contact seal section. And the protrusion has an inner periphery to define a parting portion in an approximately cylindrical shape in a non-contact relationship with the inner ring.

Since the parting portion which is the base point for separating the dies of the molding the seal is formed in a cylindrical shape, the mold portion for that portion can have a cross section with an obtuse angle or right angle, eliminating any acute angle portion so that the strength of the mold is increased for stable mold shape. Accordingly, the portion of the seal assembly in a slight contact relationship with the inner ring is better in the dimension stability, the rotation torque of the bearing is lower, and noise can be prevented from occurring when the bearing is rapidly rotated in an abutting relation with a diaphragm spring.

In another feature of the present invention, a clutch release bearing comprises an outer ring which is not rotatable during use, a rotatable inner ring which is rotatable during use and has an outer diameter, rolling members which are provided between the outer ring and the inner ring, and a seal which is fixed to the outer ring and comprises a labyrinth seal section located in an external portion of the bearing to form a labyrinth seal with the inner ring, and a contact seal section located in an internal portion of the bearing, and having a root portion or cantilever arm portion with a thickness and a contact portion with a thickness. The contact portion is in a slight contact relationship with the inner ring such that the ratio of the interference with respect to the outer diameter of the inner ring is between from $\frac{1}{1000}$ to $\frac{1}{100}$, and the thickness of the root portion or cantilever arm portion is smaller than the thickness of the contact portion.

Since the thickness of the root portion or cantilever arm portion of the contact seal section is smaller than the thickness of the contact portion, the tightening or pressing force of the contact seal section with respect to the inner ring can be decreased, which cooperates with the slight contact to decrease the rotation torque of the bearing. Accordingly, noise can be prevented from occurring when the bearing is rapidly rotated in an abutting relation with a diaphragm spring.

In another feature of the present invention, a clutch release bearing comprises an outer ring which is not rotatable during use, a rotatable inner ring which is rotatable during use and has an outer diameter, rolling members which are provided between the outer ring and the inner ring, and a seal which is fixed to the outer ring, and comprises a labyrinth seal section located in an external portion of the bearing and having an inner periphery defining a cylindrical shape to form a labyrinth seal with the inner ring, and a contact seal section located in an internal portion of the bearing in a slight contact relationship with the inner ring such that the ratio of the interference with respect to the outer diameter of the inner ring is between from $\frac{1}{1000}$ to $\frac{1}{100}$.

Unless the solid foreign matter such as dust is sufficiently prevented with the labyrinth seal section from entering the interior, both of the solid foreign matter and liquid foreign matter such as muddy water must be prevented with the contact seal section from entering the interior, and therefore the contact seal section must be strengthened e.g. by increasing the interference. This causes increase in the rotation torque of the bearing and easy occurrence of noise when the bearing is rapidly rotated in an abutting relation with a diaphragm spring.

On the other hand, by forming the inner periphery of the labyrinth seal section in a cylindrical shape and making its axial length longer as in the present invention, the labyrinth seal section functions to preventing a substantial part of the solid foreign matter such as dust from entering the interior, while the contact seal section functions to prevent mainly the liquid foreign matter such as muddy water, having strong penetration energy, from entering the interior, which can be achieved with the slight contact seal. Accordingly, the rotation torque of the bearing can be decreased, and noise can be prevented from occurring when the bearing is rapidly rotated in an abutting relation with a diaphragm spring.

Hereunder is a detailed description of an embodiment of the present invention, with reference to the drawings.

Figure 2:
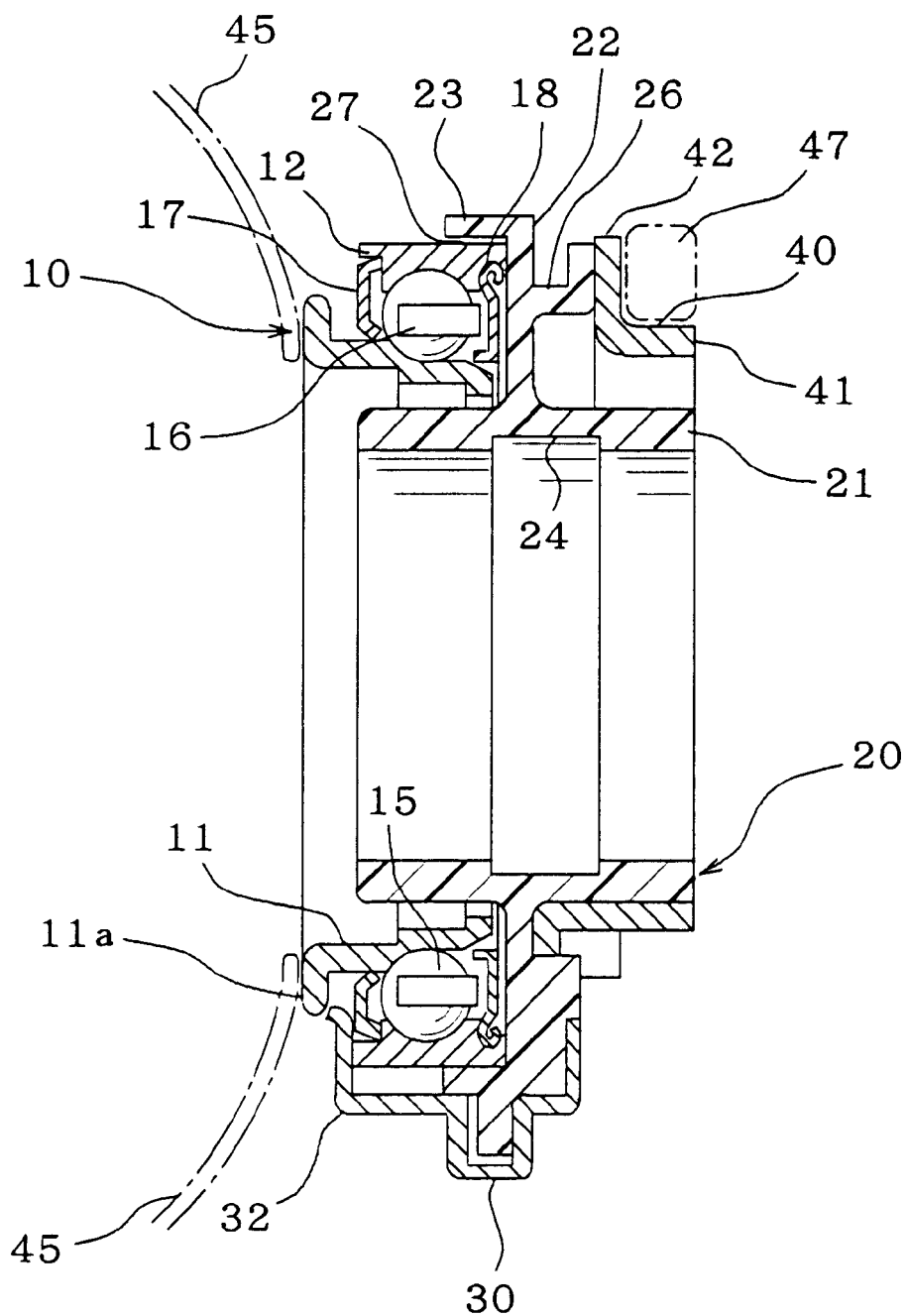
FIG. 2 is a cross sectional view in the axis direction, as in the direction of the arrow, taken along the line of II—II in FIG. 1.

FIG. 1 is a diagram of a clutch release bearing device incorporating an embodiment of the present invention, as seen from a shift fork side. FIG. 2 is a view of an axial section cut along the II—II in FIG. 1 and viewed in the direction of the arrows.

In FIG. 2, the clutch release bearing device comprises a clutch release bearing 10, a guide sleeve 20 serving as a bearing holding member, and a spring member 30 serving as a coupling member. The clutch release bearing 10 comprises an inner ring 11 in the form of an approximately circular tube having an abutting portion 11a at the left end, an outer ring 12 in the form of a short circular tube containing the inner ring 11 concentrically thereinside, a plurality of rolling members, specifically balls 15 disposed reliably between the inner ring 11 and the outer ring 12, a retainer 16 for holding the balls at a predetermined spacing, and seals 17 and 18 for sealing the spaces formed between the inner ring 11 and the outer ring 12 on axially opposite sides of the balls 15. The inner ring 11 is rotatably supported with respect to the outer ring 12. The abutting portion 11a of the inner ring 11 has a shape turned over in the radial direction, and abuts against a diaphragm spring 45 (depicted with phantom lines) of a clutch cover (not shown). Moreover, the end portion opposite to the abutting portion 11a of the inner ring 11 remains as formed after press blanking processing, without being machined, thus reducing the production cost.

On the other hand, a guide sleeve 20 is made of molded resin, and comprises a body 21 in the form of a circular tube, a flange portion 22 extending radially from the external periphery of the body 21 in the vicinity of the center thereof, an external wall portion 23 protruding axially to the left at the radially outward edge of the flange 22, and guide portions 25 (FIG. 1) protruding axially at the radially outward edge of the flange 22. A guide shaft (not shown) extends inside the body 21, and the body 21 is slidable on the guide shaft. Inside the body 21, there is provided an enlarged diameter portion 24. The enlarged diameter portion 24 functions such that foreign matter is not caught when the body 21 slides on the guide shaft. The external wall portion 23 is provided outside the clutch release bearing 10, and functions as a radial movement restricting portion of the clutch release bearing. In order that the clutch release bearing 10 can move radially, a gap 27 is formed between the radially outer periphery of the outer ring 12 and the radially inner periphery of the external wall 23. A horizontal groove 26 is provided in the midway portion of the flange portion 22, and a clip (not shown) for securing the shift fork 47 (depicted by phantom lines) is inserted in the horizontal groove 26.

As is clear from FIG. 1, the spring member 30 provided as two members of the same shape has the function of attaching the clutch release bearing 10 to the guide sleeve 20. A stopper 22g of the guide sleeve 20 functions in such a manner that when the spring member 30 is attached to the guide sleeve 20, the stopper 22g engages with a notch 38 in the spring member 30 to thereby prevent the spring member 30 from being pushed in further inward.

As shown in FIG. 1 and FIG. 2, a reinforcing member 40 is provided on the shift fork side of the guide sleeve 20. The reinforcing member 40 comprises a cylinder portion 41, an anvil portion 42 in plate form protruding from approximately the center of the cylinder portion 41 upward and downward, and a flange portion 43 extending radially from an end of the cylinder portion 41, and is formed by pressing a relatively thin plate and subsequently subjecting this to a hardening process. Hence, pronounced wear does not occur at contact portions with the shift fork.

When the cylinder portion 41 is attached to the guide sleeve 20, the cylinder portion 41 is fitted to the body 21 with a gap, so that it can support the guide sleeve 20 in a reinforcing manner at the time when the guide sleeve 20 undergoes a load. The upper side and the lower side of the cylinder portion 41 are extended so as to correspond to the anvil portion 42 to thereby form a rectangular portion 41a (FIG. 1). The rectangular portion 41a has a function for guiding the shift fork and a function for ensuring the rigidity of the anvil portion 42.

As shown in FIG. 1, a rectangular notch 43a is formed in the periphery of the flange portion 43 of the reinforcing member 40. The notch 43a engages with a protrusion 22f formed at a position of the guide sleeve 20 corresponding to the flange portion 22, at the time of assembly, to thereby perform a function as a detent for the reinforcing member 40 as well as a positioning function.

Next is a description of an operation of the clutch release bearing device, which incorporates an embodiment of the present invention.

In FIG. 1, a shift fork 47 (depicted by phantom lines) is pivoted so that a tip thereof abuts against the anvil portion 42 of the reinforcing member 40 to thereby apply a predetermined load. Since the plate thickness of the reinforcing member 40 is relatively thick, and the rigidity thereof is sufficient, it can take a large load applied from the shift fork 47. The clutch release bearing device slides axially on the guide shaft (not shown) due to the input force from the shift fork 47, to thereby cause the abutting portion 11a of the inner ring 11 to abut against the diaphragm spring 45 of the clutch cover (not shown). In such a case, even if the diaphragm spring 45 is rotating, since the inner ring 11 is rotatable, the inner ring 11 rotates as one with the diaphragm spring 45 after abutment therewith. Moreover, the bearing device moves in the axial direction, so that the diaphragm spring 45 is pushed to operate the clutch (not shown).

The spring member 30 has an appropriate plate thickness, and since it supports the clutch release bearing 10 with respect to the guide sleeve 20 only by a frictional force acting between a pushing portion 32 and the outer ring 12, the bearing 10 can move radially with respect to the guide sleeve 20. Therefore, when the abutting portion 11a of the inner ring 11 abuts against the diaphragm spring 45, if they are eccentric, a known force trying to position the bearing 10 concentric therewith is generated, to thereby move the bearing 10 radially so that automatic aligning can be attained. The external wall portion 23 of the guide sleeve 20 has a function for restricting the bearing 10 so as not to move radially outward by more than a predetermined quantity. Moreover, since many types of conventional ball bearings do not have a flange on the outer ring thereof, then if constructed so that the outer ring is clamped between the spring members 30, as in this embodiment, it is not necessary to reconstruct the outer ring itself, and an existing outer ring can be used, thus contributing to a cost reduction.

With the clutch release bearing 10, since the balls 15 roll along the rolling passage between the inner ring 11 and the outer ring 12, the intrusion of particles from elements constituting the clutch release bearing device, and particularly foreign matter is highly undesirable. Therefore, with the clutch release bearing in the prior art, a labyrinth seal is provided to prevent abrasive powder from the clutch or the like from intruding into the inside of the bearing.

Moreover, while consideration is given to providing a cooling air hole on the housing enclosing the clutch, there is the possibility of foreign matter such as dust, water or the like intruding from the outside via such an air hole. With the clutch release bearing in the prior art provided with a labyrinth seal, relatively large solid foreign matter can be prevented from intruding into the inside of the bearing by means of the labyrinth seal. However foreign matter such as muddy water or the like can pass through the labyrinth seal and intrude into between a race and the rolling bodies, so that there is the possibility of early wear in the future. To cope with such early wear, the clutch release bearing must be replaced in a short cycle, thereby causing a problem in that the maintenance cost increases.

On the other hand, it is considered that if a contact-type seal is provided instead of the labyrinth seal, even foreign matter such as muddy water or the like can be prevented from intruding into the inside of the bearing. However, the contact-type seal has the property that a predetermined resistance is given to the relative rotation of the inner ring and the outer ring due to frictional force based on the contact. When the clutch is coupled, the inner ring is abutted against the diaphragm spring of the rotating clutch to rotate as one therewith. However, in many cases, they undergo rapid rotation. And since the above described resistance acts so as to suppress the rotation of the inner ring, slipping occurs between the diaphragm spring and the inner ring, so that a rubbing noise may be generated. Such a problem is likely to be caused when the viscosity of the grease is high, such as when the temperature is low, giving a disturbance to passengers. With this embodiment, the above described conflicting problems are solved in the following manner.

Figure 3:
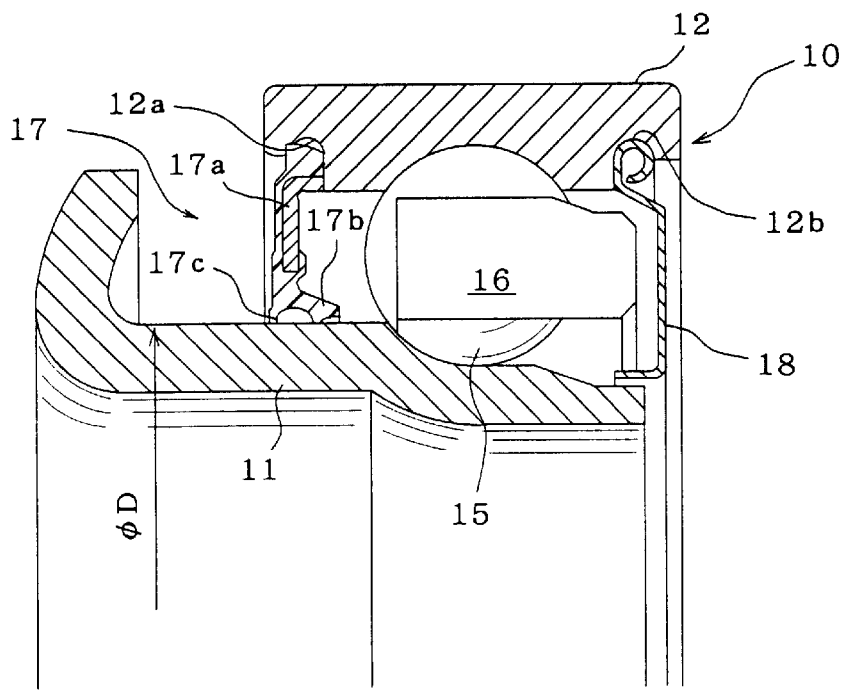
FIG. 3 is a cross sectional view in the axis direction of the clutch release bearing in an embodiment of the present invention.

FIG. 3 is an axial cross sectional view of the clutch release bearing 10. The left hand side in FIG. 3 is the engine side, and the right hand side is the transmission side. In FIG. 3, peripheral grooves 12a, 12b are formed on the inner periphery at opposite ends of the outer ring 12. Attached to the peripheral groove 12b on the transmission side is the radially outer edge of a labyrinth seal 18 which is a metal plate, to prevent foreign matter from intruding from the transmission side past the outer peripheral surface of the inner ring 11, and to prevent the outflow of grease. In addition, since the flange portion 22 (FIG. 1) of the guide member 20 is disposed on the right hand side of the labyrinth seal 18, there is little possibility of splashing of muddy water or the like. Hence, it is considered that there is no particular problem to use of a conventional labyrinth-type seal. Moreover, if the seal 18 is a labyrinth type, the rotational resistance of the inner ring 11 can be kept low. Hence rubbing noise at the time of operation of the clutch can be suppressed to a minimum.

On the other hand, attached to the peripheral groove 12a on the engine side is a contact-type seal 17. The seal 17 has an approximately disk-shaped core metal 17a to which the outside edge of the peripheral groove 12a is attached, a contact seal section comprising a contact portion or lip portion 17b having a triangular shape in cross section which extends from the radially inner edge of the core metal 17a and abuts against the external periphery of the inner ring 11, and a labyrinth seal section which extends from the radially inner edge of the core metal 17a on the engine side of the lip portion 17b and has a labyrinth portion 17c which is located slightly away from the external periphery of the inner ring 11. The lip portion 17b and the labyrinth portion 17c are integrally formed from rubber, but may be separate bodies.

As described above, according to this embodiment, large solid foreign matter such as abrasion powder from the clutch friction plate which is likely to be flung from the engine side is caught by the labyrinth portion 17c of the seal 17, to thereby prevent the foreign matter from intruding inward. On the other hand, fluid or semi-fluidized foreign matter such as muddy water or the like which is splashed and comes in via an air hole provided in the clutch housing (not shown), even if this does pass through the labyrinth portion 17c, it is caught by the contact portion or lip portion 17b and thus prevented from intruding inward. Hence, wear of the balls 15, and the rolling paths of the inner ring 11 and the outer ring 12 can be prevented as much as possible, and the life span of the clutch release bearing 10 can be extended.

Incidentally, since the contact portion or lip portion 17b is to be brought into contact with the external periphery of the inner ring 11, if interference or the pressing force is large, the frictional force acting between the contact portion or lip portion 17b and the inner ring 11 increases so that there is the possibility that slipping may occur between the diaphragm spring and the inner ring 11 at the time of operation of the clutch. On the other hand, since the labyrinth portion 17c is provided outside (left hand side) of the contact portion or lip portion 17b, there is little possibility of relatively large solid foreign matter reaching the contact portion or lip portion 17b.

Hence it is not necessary to make the interference or the pressing force substantially large. Therefore, with this embodiment, the interference and pressing force are adjusted in the following manner.

Figure 4:
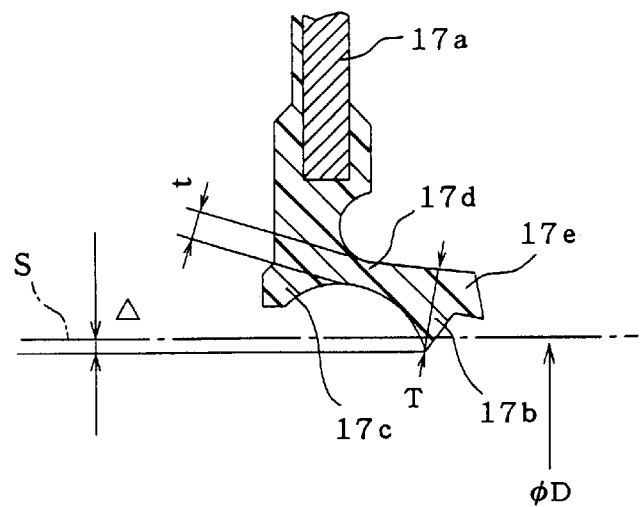
FIG. 4 is a enlarged view of part of the seal 17 in FIG. 3.

FIG. 4 is a diagram showing a part of the seal 17 enlarged, and showing the free condition where the seal 17 is not abutted against the inner ring 11. As is clear in FIG. 4, the contact portion or lip portion 17b is supported by a cantilever arm portion 17d extending from the labyrinth seal section inward (toward the right), and is located at a position offset in the axial direction from the core 17a. On the other hand, the interference $\Delta$ can be expressed as the difference between an outer diameter $\phi D$ of the external peripheral seal faces of the inner ring 11 and the minimum inner diameter of the contact portion or lip portion 17b (an apex of a triangle in section in FIG. 4) in the free condition.

The cantilever arm portion 17d is the root portion of the lip portion or contact portion 17b. The contact seal section has a protrusion 17e which has an internal periphery to define a parting portion in an approximately cylindrical shape. Here the term "parting portion" is a base point for separating the upper and lower dies for molding the seal.

Here, since the pressing force imparted to the inner ring 11 from the contact portion or lip portion 17b is mainly caused to the basis of the elasticity of the cantilever arm portion or root portion 17d and the interference $\Delta$ described later, by giving these appropriate values, generation of a rubbing noise can be suppressed while improving the durability of the bearing.

The cantilever arm portion or root portion 17d has a thickness t, while the contact portion or lip portion 17b has a thickness T, and t<T. According to an analysis made by the present inventors, it was found that a suitable pressing force could be obtained by setting t=0.1 to 0.5 mm, and $\Delta/\phi D=$ 1/1000 to 1/100 (0.1 to 1%), and more preferably, by setting $\Delta/\phi D=$1/1000 to 1/200 (0.1 to 0.5%).

Also according to the analysis made by the present inventors, it was found that with the lip portion 17b in this embodiment in a so-called slight contact condition, the seal resistance occupies about 5 to 40% of the overall rotation torque of the clutch release bearing 10, in the operative temperature range (−40° C. to 120° C.). Here, in particular at the time of very low temperature, the seal resistance also increases, but agitation resistance caused by solidification of the grease increases more noticeably. Hence the seal resistance becomes less occupying less than 10% of the overall rotation torque of the clutch release bearing 10. Therefore, even compared to the case where a non-contact type seal is provided, the rotation torque of the clutch release bearing 10 does not increase significantly.

On the other hand, when the operative temperature increases, the grease is semi-fluidized so that the agitation resistance of the grease decreases significantly. Hence the seal resistance becomes larger, about 40%, with respect to the overall rotation torque of the clutch release bearing 10. However in such a case, since the overall rotation torque of the clutch release bearing 10 drops significantly, the above described problem such as a rubbing noise or the like at the time of releasing the clutch is unlikely to occur.

Here, since it is generally at the time of operation of the clutch release bearing 10 that the operative temperature increases, then in this condition, in view of extending the life span of the bearing, it becomes important to effectively prevent intrusion of foreign matter from outside. With this embodiment, since in this condition a slight contact-type seal is formed, intrusion of foreign matter can be effectively prevented, to thereby extend the life span of the bearing.

Furthermore, since the tip of the contact portion or lip portion 17b is formed in a substantially triangular shape in cross section, even if the pressing force of the lip portion 17b is low, the surface pressure on the tip portion increases. Hence, even if the interference is small, intrusion of foreign matter can be effectively prevented. In addition, with this embodiment, the contact portion or lip portion 17b is arranged so as to extend from the core metal 17a on the side closer to the ball 15. However the contact portion or lip portion 17b may be arranged oppositely so as to extend from the core metal 17a on the engine side (left side). According to the arrangement shown in FIG. 3 and FIG. 4, however, the contact portion or lip portion 17b is arranged on the internal side of the labyrinth portion 17c, which is preferable in terms of preventing foreign matter from intruding, as described above.

Furthermore, according to the present invention, the contact face of the inner ring 11 with the contact portion or lip portion 17b is made as a cylindrical shape parallel to the axis. Therefore, even in the case where the inner ring 11 abuts against the diaphragm spring 45 of the clutch (not shown) and is subjected to a large force at the time of releasing the clutch so as to be displaced in the axial direction, the interference of the contact portion or lip portion 17b hardly changes. Hence, the sealing property can be favorably maintained, without changing the rotation torque of the clutch release bearing 10.

As described above, the present invention has been described with reference to one embodiment. However, the present invention is not to be construed as being limited to the above described embodiment, and it is a matter of course that the present invention can be appropriately modified and improved. For example, with the above described embodiment, only the seal 17 is a contact type seal, but the seal 18 may be also a slight contact seal of a contact-type made of rubber, so long as resistance is not a big problem.

With the seal of the present invention, Since it comprises the labyrinth seal portion extending from one of the inner ring and outer ring and kept in a non-contact state with reference to the other ring, and the lip portion provided on the inner side of the labyrinth seal and kept in a contact state with reference to the other ring, for example relatively large solid foreign matter is captured at the labyrinth seal portion, and it is prevented from entering the interior of the bearing. On the other hand, semi-fluid foreign matter such as dirty water, which may not be captured at the labyrinth seal portion, is captured at the lip portion, and it is prevented from entering the interior of the bearing. Accordingly, the seal effects of the seal can be improved. With the present invention, any foreign matter is prevented from entering the interior of the bearing, to improve the durability and noise is never produced even at lower temperature.

What is claimed is:

1. A clutch release bearing comprising;

an outer ring, a rotatable inner ring having an outer diameter, rolling members provided between the outer ring and the inner ring, and a seal fixed to the outer ring, and comprising a labyrinth seal section located in an external portion of the bearing to form a labyrinth seal with the inner ring, and a contact seal section located in an internal portion of the bearing to be in a slight contact relationship with the inner ring such that the ratio of the interference with respect to the outer diameter of the inner ring is between from $1/1000$ to $1/100$, and having a protrusion located on the internal side portion of the contact seal section and the protrusion having an inner periphery to define a parting portion in an approximately cylindrical shape in a non-contact relationship with the inner ring.

2. A clutch release bearing comprising;

an outer ring, a rotatable inner ring having an outer diameter, rolling members provided between the outer ring and the inner ring, and a seal fixed to the outer ring, and comprising a labyrinth seal section located in an external portion of the bearing to form a labyrinth seal with the inner ring, and a contact seal section located in an internal portion of the bearing, and having a root portion with a thickness and a contact portion with a thickness, the contact portion being in a slight contact relationship with the inner ring such that the ratio of the interference with respect to the outer diameter of the inner ring is between from $1/1000$ to $1/100$, the thickness of the root portion being smaller than the thickness of the contact portion.

3. A clutch release bearing comprising;

an outer ring, a rotatable inner ring having an outer diameter, rolling members provided between the outer ring and the inner ring, and a seal fixed to the outer ring, and comprising a labyrinth seal section located in an external portion of the bearing and having an inner periphery defining a cylindrical shape to form a labyrinth seal with the inner ring, and a contact seal section located in an internal portion of the bearing in a slight contact relationship with the inner ring such that the ratio of the interference with respect to the outer diameter of the inner ring is between from $1/1000$ to $1/100$.

* * * * *